US011593098B2

(12) United States Patent
Vincent et al.

(10) Patent No.: US 11,593,098 B2
(45) Date of Patent: Feb. 28, 2023

(54) SYNCHRONIZATION OF SOURCE CODE UNDER DEVELOPMENT IN MULTIPLE CONCURRENT INSTANCES OF AN INTEGRATED DEVELOPMENT ENVIRONMENT

(71) Applicant: Journey Mobile, Inc., Denver, CO (US)

(72) Inventors: Julien Vincent, Denver, CO (US); Dylan Vorster, Denver, CO (US)

(73) Assignee: Journey Mobile, Inc., Denver, CO (US)

( * ) Notice: Subject to any disclaimer, the term of this patent is extended or adjusted under 35 U.S.C. 154(b) by 120 days.

(21) Appl. No.: 17/374,913

(22) Filed: Jul. 13, 2021

(65) Prior Publication Data

US 2022/0012049 A1 Jan. 13, 2022

Related U.S. Application Data

(60) Provisional application No. 63/051,148, filed on Jul. 13, 2020.

(51) Int. Cl.
*G06F 8/71* (2018.01)
(52) U.S. Cl.
CPC ..................... *G06F 8/71* (2013.01)
(58) Field of Classification Search
CPC ....................................................... G06F 8/71
See application file for complete search history.

(56) References Cited

U.S. PATENT DOCUMENTS

| 8,352,870 | B2* | 1/2013 | Bailor | G06Q 10/10 |
| | | | | 715/230 |
| 10,037,339 | B1* | 7/2018 | Kleinpeter | G06F 16/2246 |
| 10,175,978 | B2* | 1/2019 | Biddle | G06F 11/3668 |
| 10,795,670 | B2* | 10/2020 | Kryzhanovsky | G06F 8/71 |
| 11,150,893 | B2* | 10/2021 | Sabath | G06F 8/71 |
| 2007/0283321 | A1* | 12/2007 | Hegde | G06F 8/71 |
| | | | | 717/110 |
| 2013/0173530 | A1* | 7/2013 | Laron | G06F 16/176 |
| | | | | 707/608 |
| 2013/0311598 | A1* | 11/2013 | Arrouye | G06Q 10/10 |
| | | | | 709/217 |
| 2014/0258969 | A1* | 9/2014 | Brown | G06F 8/30 |
| | | | | 717/103 |
| 2015/0106790 | A1* | 4/2015 | Bigwood | G06F 11/3624 |
| | | | | 717/127 |
| 2018/0107455 | A1* | 4/2018 | Psistakis | H04L 67/10 |

* cited by examiner

*Primary Examiner* — Douglas M Slachta
(74) *Attorney, Agent, or Firm* — Brill Law Office; Jeffrey Brill (57) ABSTRACT

Edits made to source code being concurrently accessed by multiple instances of an IDE are synchronized. The multiple instances access a draft of a development project. Edits made to specific files of the draft are maintained as corresponding CRDT files. Edits made to files of the draft by the multiple instances of the IDE are synchronized, with the CRDTs resolving conflicts resulting from edits made to files of the draft by different ones of the instances. When a specific instance of the IDE makes an edit to a specific file of the draft, the instance updates a corresponding local CRDT file to reflect the edit. The edit is pushed as a CRDT patch to each of the other instances of the IDE. The received CRDT patch is used to update a local corresponding CRDT file, by each of the other instances.

22 Claims, 9 Drawing Sheets

SYNCHRONIZATION OF SOURCE CODE UNDER DEVELOPMENT IN MULTIPLE CONCURRENT INSTANCES OF AN INTEGRATED DEVELOPMENT ENVIRONMENT

CROSS-REFERENCE TO RELATED APPLICATION

The present application claims the benefit under 35 U.S.C. § 119(e) of U.S. Provisional Patent Application Ser. No. 63/051,148, entitled "Web-based Low-code application Development and Deployment Platform," filed on Jul. 13, 2020, and having the same assignee, the entire contents of which are incorporated herein by reference.

TECHNICAL FIELD

This disclosure pertains to synchronization of source code under development in multiple concurrent instances of an integrated development environment ("IDE").

SUMMARY

Edits made to source code being concurrently accessed by multiple instances of an integrated development environment ("IDE") are synchronized. The multiple instances of the IDE access a draft of a development project. The development project comprises multiple source code files under a source code control system. The draft comprises the files of the development project at a specific point in time as stored in the source code control system, and a set of edits subsequently made by instances of the IDE but not yet committed to the source code control system. Edits made to specific files of the draft are maintained as corresponding conflict-free replicated data type ("CRDT") files, where a specific CRDT file is maintained for each edited file of the draft.

Each instance of the IDE may comprise a source code editor e.g., Monaco) a synchronization processes, and a CRDT implementation (e.g., YJS). The source code editor of a given instance of the IDE may be associated with a file placeholder, which may in turn be associated with either a source code file in the source code control system or a CRDT file corresponding to an edited source code file in the draft. When the placeholder is associated with a CRDT file corresponding to an edited source code file in the draft, a two-way binding is made between an internal representation of the CRDT file of the source code editor and representation of the CRDT file by an underlying CRDT document, meaning that any changes made the CRDT document will flow into the editor's state, and any changes made to the editor's state will flow into the CRDT document.

Edits made to files of the draft by the multiple instances of the IDE are synchronized, with the CRDTs resolving conflicts resulting from edits made to files of the draft by different ones of the instances. Thus, each one of the instances of the IDE has access to the same version of the edited files of the draft, with conflicts having been resolved by the CRDTs. When a specific instance of the IDE makes an edit to a specific file of the draft, the instance updates a corresponding local CRDT file to reflect the edit. The edit is also pushed as a CRDT patch to each of the other instances of the IDE that are accessing the draft. This may take the form of transmitting the CRDT patch by the specific instance to a synchronization service, which in turn transmits the CRDT patch to each of the other instances of the IDE that are accessing the draft. The CRDT patch corresponding to the edit is thus received by each of the other instances.

The received CRDT patch is used to update a local corresponding CRDT file to reflect the edit, by each of the other instances of the IDE. Thus, all edits made to specific files of the draft are maintained as corresponding CRDT files by each instance of the IDE accessing the draft. Edits made to files of the draft by the instances of the IDE are thus synchronized between instances, with the CRDT implementations resolving conflicts resulting from edits made to files by different ones of the instances.

A persistence service also maintains the CRDT patches corresponding to all edits to files of the draft made by the instances of the IDE accessing the draft. The persistence service may merge all of the CRDT patches corresponding to edits made to each edited file of the draft. The persistence service may store, for each one of the edited files, the merged CRDT patches as a corresponding CRDT file.

A draft may be committed to the source code control system. Responsive to a control signal from a specific instance of the IDE, a commit to the source code control system is generated, by the persistence service. The commit is based on the stored merged CRDT patches made to each one of the edited files of the draft. The CRDT conflict-resolved edits made to each one of the edited files of the draft are committed to the source code control system, by the persistence service. Once the commit has been executed, the draft may, but need not, be discarded persistence service. An uncommitted draft may also be discarded without saving the edits, responsive to a control signal from a specific instance of the IDE.

Multiple concurrently processed drafts originating from the same point in time in the source code control systems may be merged in a sandbox outside of the source code control system, with the owner of the latter of the drafts to be committed being required to resolve conflicts between the drafts outside of the source code control system, prior to committing that draft.

In some implementations, the source code control system may be in the form of an instantiation of git. The instantiation of git may be wrapped with an application programming interface ("API") exposing calls that abstract access and authentication details of the instantiation of git. Git events may also be hooked, and interpreted into a common format. Actions concerning drafts may then be taken, in response to interpreted hooked git events.

The features and advantages described in this summary and in the following detailed description are not all-inclusive, and particularly, many additional features and advantages may be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict various implementations for purposes of illustration only. One skilled in the art will readily recognize from the following discussion that other implementations of the structures and methods illustrated herein may be employed without departing from the principles described herein.

DETAILED DESCRIPTION

Figure 1:
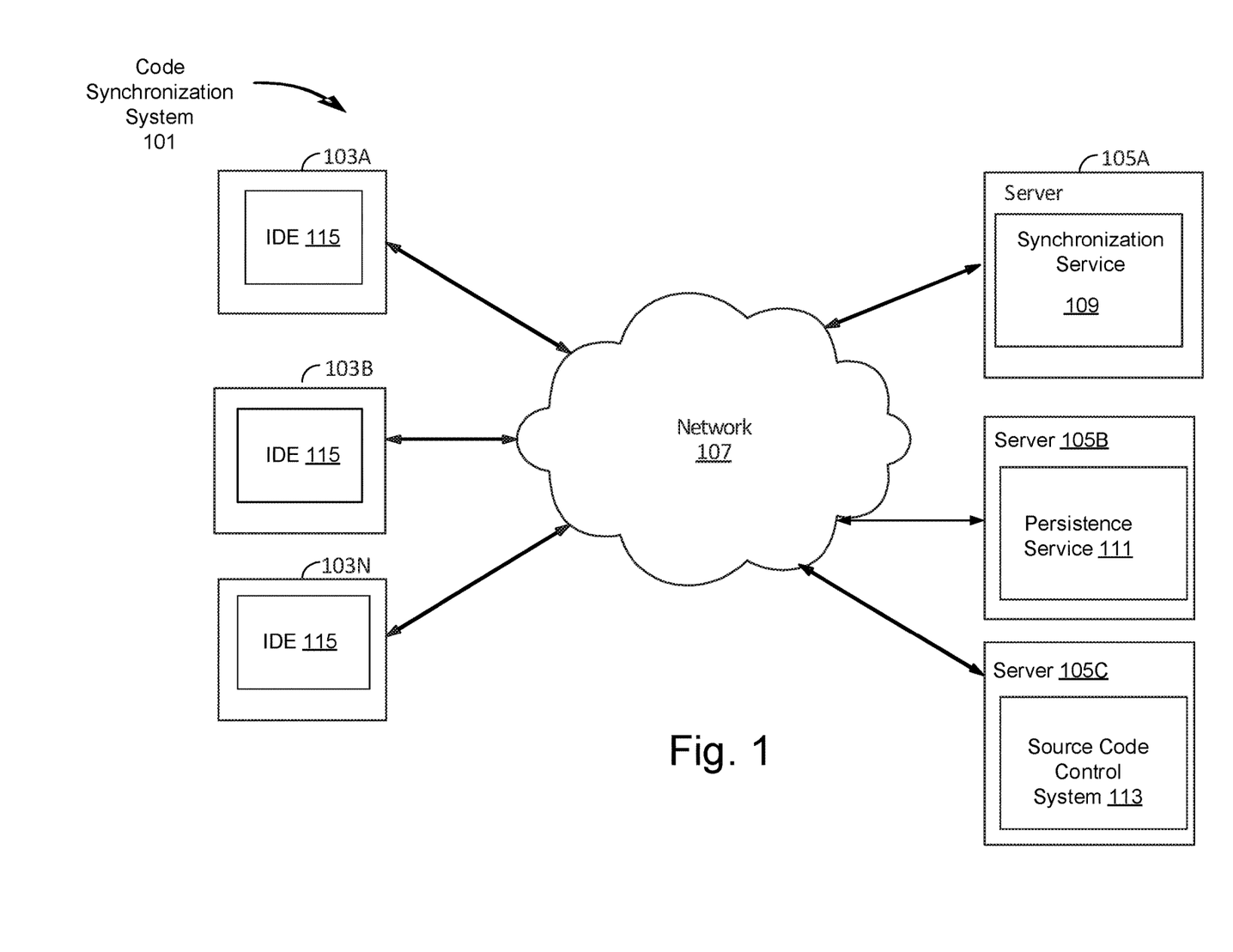
FIG. 1 illustrates a network environment in which a code synchronization system can operate, according to some implementations.

FIG. 1 is a high-level block diagram illustrating an exemplary network architecture in which a code synchronization system 101 can be implemented. Referring to FIG. 1, the illustrated network architecture comprises multiple clients 103A, 103B, and 103N (together may be referred to as "client 103") as well as multiple servers 105A, 105B, and 105N (together may be referred to as "server 105"). In FIG. 1, the code synchronization system 101 is illustrated as being distributed across the clients 103 and servers 105. It is to be understood that this is an example only. In various implementations, various functionalities of the code synchronization system 101 can be instantiated on a server 105, a client 103, or can be distributed among multiple servers 105 and/or clients 103 as desired.

In FIG. 1, a separate instance of an IDE 115 is illustrated as executing on each client 103. Although only three instances of the IDE 115 are illustrated in FIG. 1, in practice many more may be present. In addition, multiple instances of the IDE 115 may run on a single client 103. Also in FIG. 1, a synchronization service 109 is illustrated as executing on server 105A, a persistence service 111 is illustrated as executing on server 105B, and a source code control system 113 is illustrated as executing on server 105N. In some implementations, the synchronization service 109 and persistence service 111 may be instantiated as single application. In some implementations, the synchronization service 109, the persistence service 111 and/or the source code control system 113 may be distributed across multiple computing devices. The operations of the IDE 115, the synchronization service 109, the persistence service 111 and the source code control system 113 are described in detail below.

Clients 103 and servers 105 may be implemented using computer systems 610 such as the one illustrated in FIG. 10 and described below. The clients 103 and servers 105 are communicatively coupled to a network 107, for example via a network interface 248 as described below in conjunction with FIG. 10. Clients 103 are able to access applications and/or data on servers 105 using, for example, a web browser or other client software. Clients 103 may be in the form of laptops, desktops and/or other types of computers/computing devices, including mobile computing devices, comprising portable computer systems capable of connecting to a network 107 and running applications (e.g., smartphones, tablet computers, wearable computing devices, etc.). Servers 105 may be in the form of, e.g., rack-mounted computing devices, located, e.g., in data centers. Although FIG. 1 illustrates three clients 103 and three servers 105 as an example, in practice many more (or fewer) clients 103 and/or servers 105 may be deployed. In one implementation, the network 107 is in the form of the internet. Other networks 107 or network-based environments may be used in other implementations.

The functionalities of the code synchronization system 101, synchronization service 109, and/or the persistence service 111 may be implemented within a cloud-based computing environment in which their functionalities are provided as a cloud-based service over a network 107. It is to be understood that although the code synchronization system 101, IDEs 115, synchronization service 109, and persistence service 111 are illustrated in FIG. 1 as individual entities, each of these components represents a collection of functionalities, which can be instantiated as a single or as multiple modules, as desired. In some implementations, different modules of any of some or all of these components may reside on different computing devices 610 as desired. Each instance of the IDE 115 can be instantiated as an application configured to run under an operating system such as Windows, OS X, Linux, etc., or as an app for a given mobile operating system (e.g., Android, iOS, etc.).

It is to be understood that the components and modules of the code synchronization system 101, the IDEs 115, the synchronization service 109, and/or the persistence service 111 can be instantiated (for example as object code or executable images) within the system memory 617 (e.g., RAM, ROM, flash memory) of any computer system 610, such that when the processor 614 of the computer system 610 processes a module, the computer system 610 executes the associated functionality. As used herein, the terms "computer system," "computer," "client," "client computer," "server," "server computer" and "computing device" mean one or more computers configured and/or programmed to execute the described functionality. Additionally, program code to implement the functionalities of the code synchronization system 101, the IDEs 115, the synchronization service 109, and/or the persistence service 111 can be stored on computer-readable storage media. Any form of tangible computer-readable storage medium can be used in this context, such as magnetic, optical, flash and/or solid-state storage media, or any other type of media. As used herein, the term "computer-readable storage medium" does not mean an electrical signal separate from an underlying physical medium.

Figure 2:
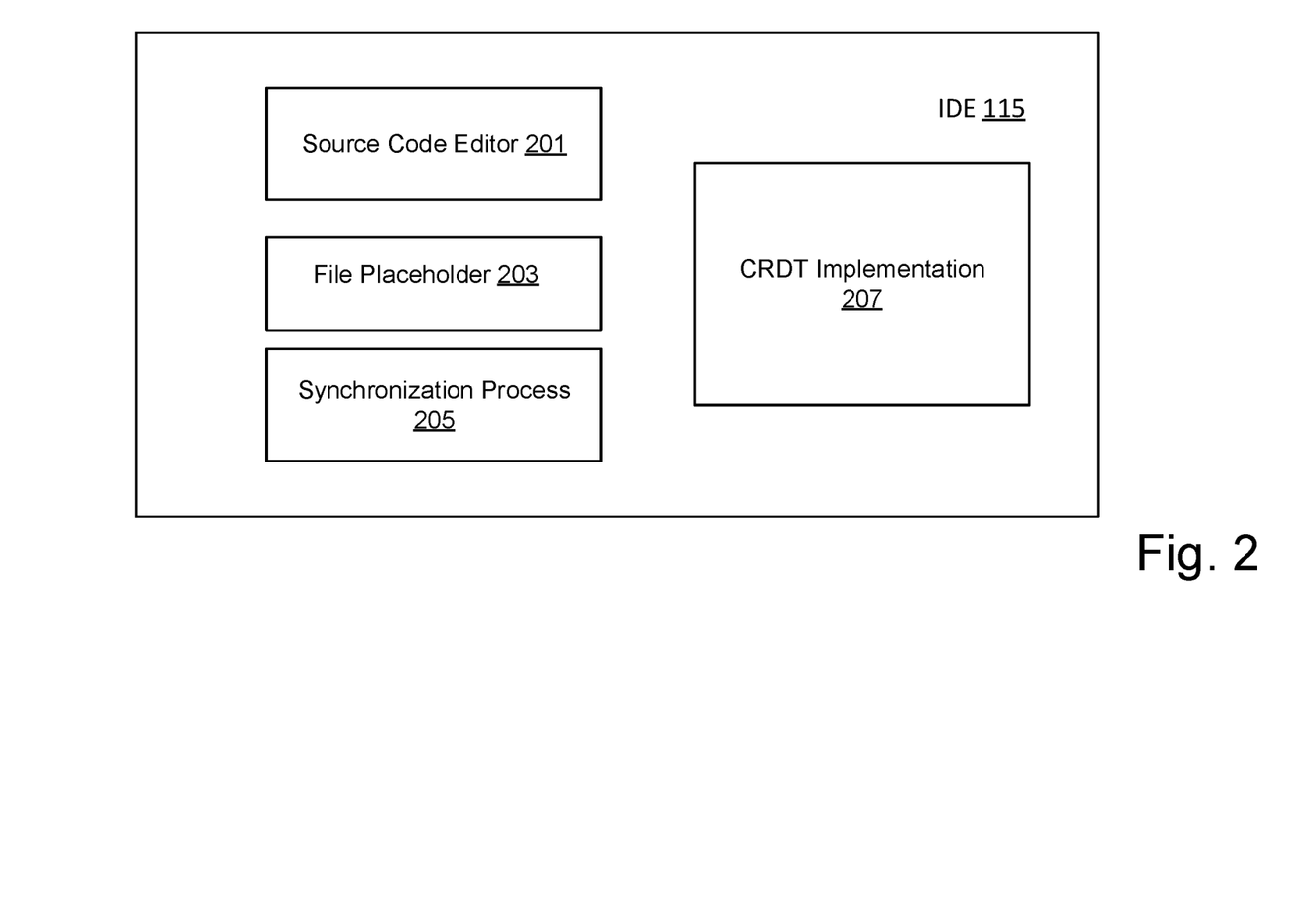
FIG. 2 illustrates an instance of an IDE, according to some implementations.

FIG. 2 illustrates an instance of the IDE 115 according to some implementations. An IDE 115 refers to a software application that provides comprehensive facilities to computer programmers for software development. IDEs 115 present a single program in which software development can be done, including components for authoring, editing, compiling, deploying and debugging software. As illustrated in FIG. 2, in some implementations an instance of the IDE 115 includes a source code editor 201, a file placeholder 203, a synchronization process 205, and a CRDT implementation 207. An IDE 115 typically but not necessarily includes additional components such as a compiler, a linker, a debugger, build automation tools, etc. These additional components of the IDE 115 are not illustrated in FIG. 2, as their functionality is not under discussion herein in conjunction with the code synchronization system 101.

In one implementation, the source code editor 201 is in the form of the Monaco Editor. In other implementations, different source code editors may be used, such as Code Mirror, Atom, gedit, etc. In general, a source code editor is a text editor configured specifically for the editing of source code for the development of computer programs. The file placeholder 203 is a virtual file, which may be implemented as a file handle which may be associated with (e.g., point to) either a source code file in the source code control system 113 or a CRDT file corresponding to an edited source code file in a draft of a development project (these features are described in greater detail below). The IDE-level synchronization processes 205 communicates with the synchronization service 109 concerning edits made to source code files in the draft, to synchronize these edits between all instances of the IDE 115 as described in detail below.

In one example, the CRDT implementation 207 is in the form of YJS. Other CRDT implementations may be used as desired. A conflict-free replicated data type (CRDT) is a data structure which can be replicated across multiple computers in a network, where the replicas can be updated independently and concurrently without coordination between the replicas, and where it is always mathematically possible to resolve inconsistencies which might result. As described in more detail below, CRDTs are used herein to resolve concurrent edits made to files of drafts of development projects by multiple instances of the IDEs 115. The CRDT implementations 207 on the IDEs 115 resolve conflicts resulting from edits made to files of the draft by different ones of the instances, such that each one of the instances of the IDE 115 has access to the same version of the edited files of the draft, with conflicts having been resolved by the CRDTs.

Figure 3:
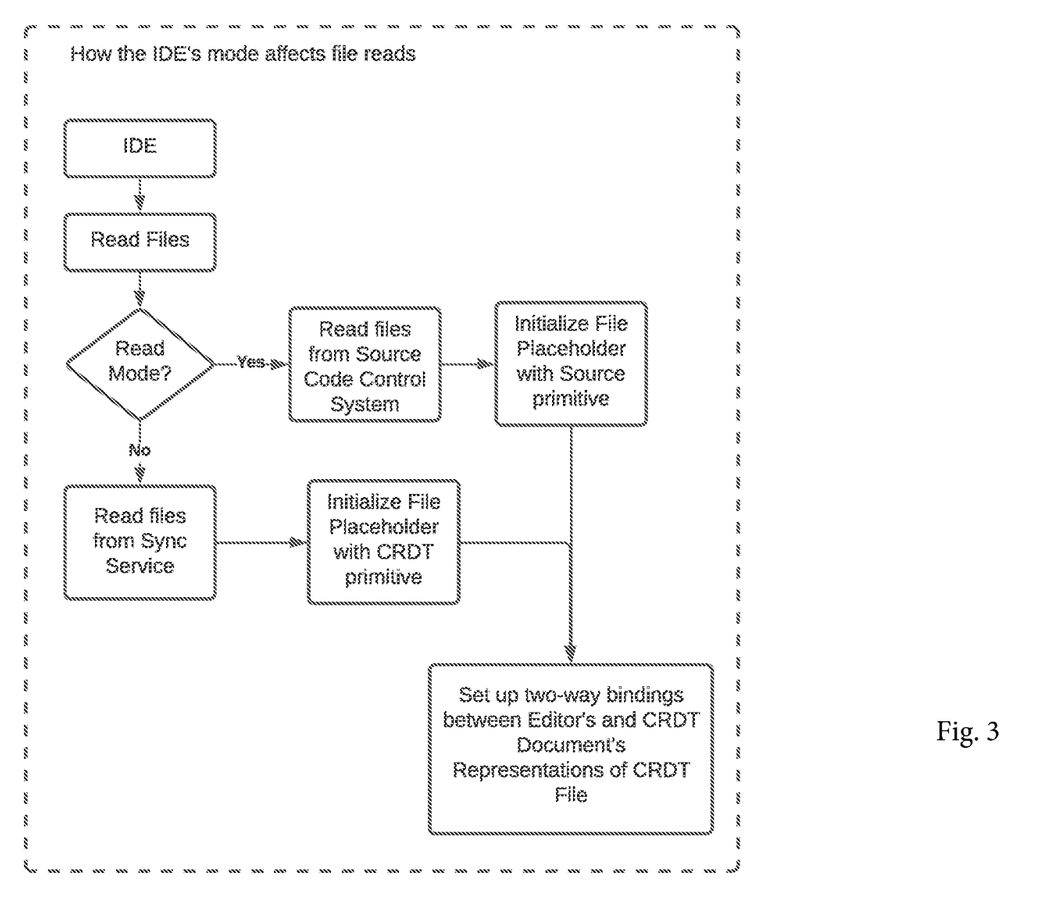
FIG. 3 illustrates a source code editor of an IDE accessing files of a draft of a development project, according to some implementations.

Turning now to FIG. 3, a source code editor 201 of an IDE 115 accessing files of a draft of a development project is illustrated. A development project comprises multiple source code files (and possibly additional files related to the development project), under the source code control system 113. The draft comprises the files of the development project at a specific point in time (e.g., a version) as stored in the source code control system 113, as well as a set of edits that have been made subsequently by instances of the IDE 115, which have not yet been committed (e.g., checked-in) to the source code control system 113.

The source code editor 201 of the specific instance of the IDE 115 is associated with a file placeholder 203, which may be associated with either a source code file 303 in the source code control system 113 or a CRDT file 301 corresponding to an edited source code file in the draft. When the source code editor 201 is simply reading a file which has not been edited in the current draft, the source code editor 201 can be thought of as being in a read mode, in which case the file placeholder 203 points to the file in the source code control system 113. More specifically, the file placeholder 203 may be initialized with a source code file primitive, so that the editor 201 displays a copy of the source code file 303 as it exists in source code control system 113.

When the instance of the editor 201 accesses a file which has already been edited in the draft, the editor can be thought of as being in draft mode, in which case the file placeholder 203 points to a CRDT file 301 comprising all of the synchronized edits made to that source file by all of the instances of the IDE 115 that are accessing the draft. To do so, the file placeholder 203 may be initialized with a CRDT primitive, so that the editor 201 displays a local copy of the synchronized CRDT file 301. In either case, the file placeholder 203 is associated with the editor 201 running on the instance of the IDE 115, as noted above. In addition, if a file placeholder 203 is associated with a specific source code file in the source code control system that has not yet been edited in the draft (e.g., the editor is in source mode), but the given source code file is then edited by an instance of the IDE, the file placeholder 203 is updated to point to a corresponding CRDT file in the draft (e.g., the editor transitions into draft mode).

When the source code editor 201 of an instance of the IDE 115 is associated with a file placeholder that points to a CRDT file corresponding to an edited source code file 301 in the draft, there is a two-way binding made between the editor's internal representation of the file and the CRDT document's representation, meaning that any changes made to the CRDT document will flow into the editor's state and vice versa (i.e., any changes made to the editor's state will flow into the CRDT document).

The edits made to the CRDT file 301 by the source code editor 201 of the instance of the IDE 115 are then subsequently be synchronized to all other instances of the IDE 115 that are accessing the draft, and all edits made to the corresponding edited source code file by editors 201 of the other instances of the IDE 115 are subsequently synchronized to the specific instance of the IDE 115 and displayed in its editor 201, via the synchronization service 109. This distribution of edits between the multiple instances of the IDE 115 accessing the draft by the synchronization service 109 is described in detail below.

Conflicts between concurrent edits to specific files made by different instances of the IDE 115 are resolved by the CRDT implementation 207. The synchronization of edits between the multiple instances of the IDE 115 is performed in real-time whenever an edit is made, and CRDT-level conflicts are resolved locally on the IDEs when they occur. Thus, the delay from text by typed in an editor 201 in one instance of an IDE 115 to the synchronized edits appearing in the editor 201 of another instance accessing the same file can typically be measured in milliseconds.

Figure 4:
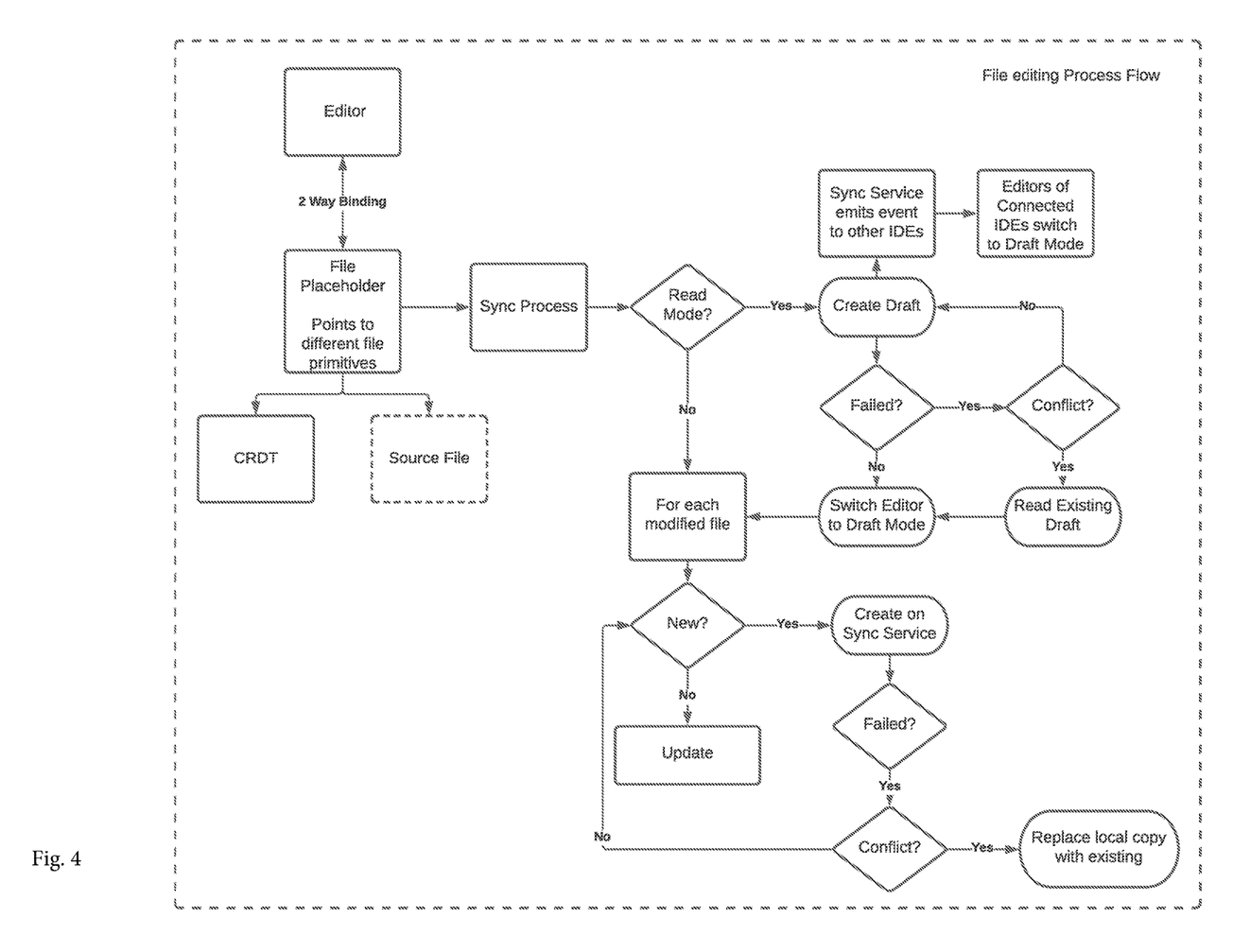
FIG. 4 illustrates creation of a draft, and transition of source editors between read and draft modes, according to some implementations.

The creation of new drafts and the transition of editors 201 between read and draft mode is now described in conjunction with FIG. 4. When an editor 201 on an instance of an IDE 115 that is in read mode edits a source code file, this has the effect of switching the editor to draft mode, creating a new draft from the point in time in the source code control system that the IDE is currently reading from, pushing the edit to all other IDEs that are to access the draft, and switching the editors of those IDEs to draft mode. If a conflict occurs as a result of two associated IDEs attempting to create a new draft concurrently, or as a result of two IDEs attempting to create a CRDT file within a draft concurrently, the conflict is resolved in favor of the IDE that is first to complete the action. An IDE that is resolved as being first creates the draft, and the other IDE(s) access that draft. In one implementation, the IDE that creates a new draft (e.g., a user operating the instance of the IDE) is the owner of the draft, and it is that party which determines which other IDEs access the draft. In some implementations, an owner can invite other IDEs to access a draft.

For each file modified by any of the IDEs accessing the draft, the edits are pushed out to all of the other IDEs, with conflicts being resolved by CRDT. The edits made to specific files of the draft are maintained as corresponding CRDT files, with a specific CRDT file being maintained for each edited file of the draft by each instance of the IDE that is accessing the draft. As described in more detail below, the synchronization service 109 also creates a set of these CRDT files which is maintained by the persistence service 111 for committing drafts to the source code control system 113 and seeding new IDEs accessing the draft.

Figure 5:
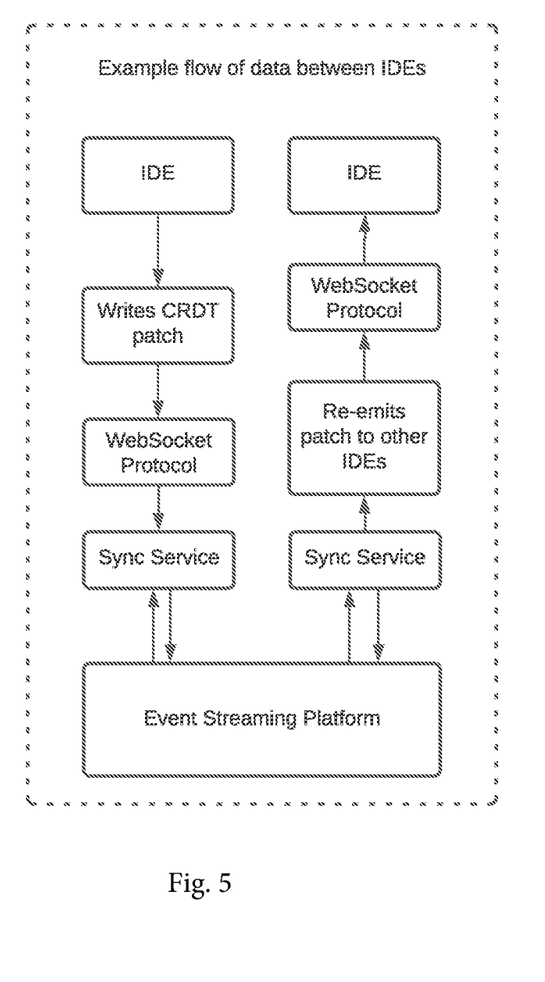
FIG. 5 illustrates operations of a synchronization service, according to some implementations.

Turning now to FIG. 5, the synchronizing of edits made to files of the draft by the instances of the IDE are described in more detail. As noted above, when a specific instance of the IDE 115A makes an edit to a specific file of the draft, the specific instance of the IDE 115A updates a corresponding local CRDT file to reflect the edit. In addition, the edit is pushed out to the other instances of the IDE 115B-N that are accessing the draft. More specifically, the local synchronization process 203 on the specific instance of the IDE 115A transmits the edit (for example in the form of a CRDT patch 503) to the synchronization service 109, e.g., by using a WebSocket Protocol 505 (or other suitable communication protocol). For example, whenever the source code editor 201 on the given instance of the IDE 115A makes an edit to a source code file of the draft, the synchronization process 203 can write the resulting delta to the given file (e.g., as a CRDT patch 503) to the synchronization service 109 via the WebSocket Protocol 505. The synchronization service 109 then distributes the CRDT patch 503 to all other instances of the IDE 115 accessing the draft, e.g., via the WebSocket Protocol 505. Each IDE in turn updates its own local copy of the draft based on the patch, with CRDT resolving any conflicts as described above.

As illustrated in FIG. 5, the synchronization service may be built on top of or otherwise use an event streaming platform 501 to communicate the CRDT patches 503 between the instances of the IDE 115. In one implementation the event streaming platform 501 is in the form of Apache Kafka, although other platforms may be used in other implementations as desired.

As a result of the above-described operation of the synchronization service 109, each instance of the IDE 115 accessing a given draft receives CRDT patches corresponding all edits made to any file of the draft by any other instance of the IDE 115. When an instance of the IDE 115 receives a CRDT patch, it updates its local corresponding CRDT file to reflect the edit. Thus, each instance of the IDE 115 accessing the draft maintains its own current copy of a CRDT file for each file of the draft that has been edited, with any conflicts resolved by CRDT.

Because any conflicts that result from concurrent edits of the source code files are resolved by the CRDT implementations 207 locally on the IDEs 115, no central conflict resolution server is required, unlike conventional document synchronization systems that rely on operational transforms. In contrast to the code synchronization system 101, conventional operational transform-based document conflict resolution requires a centralized server to resolve conflicts, and provide the resolved conflicts to all clients. Thus, under such conventional systems, a user that is disconnected from the centralized server is not able to receive conflict resolutions. The code synchronization system 101, on the other hand, uses conflict resolution functionality that is distributed between the IDEs 115, and as such multiple IDEs 115 on different computing devices 601 that are connected through any sort of network (e.g., a local Wi-Fi based LAN) but not connected to the internet are still able to maintain the current version of each file of the draft.

Figure 6:
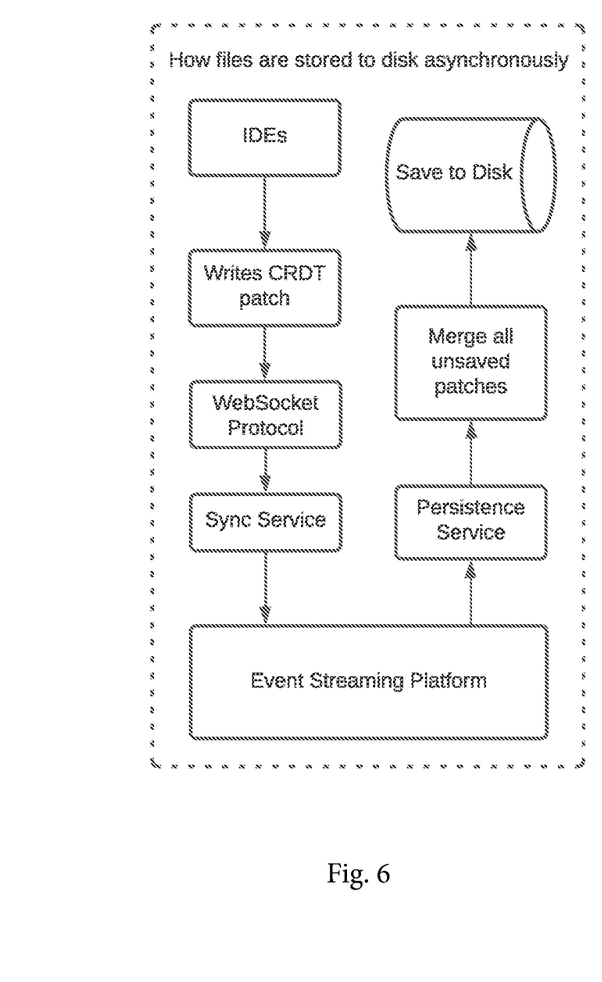
FIG. 6 illustrates operations of a persistence service, according to some implementations.

Turning now to FIG. 6, the operation of the persistence service 111 is illustrated. As noted above, in some implementations the synchronization service 109 and the persistence service 111 are instantiated as a single entity, but their functionalities are described and illustrated separately herein. Whereas each instance of the IDE maintains edits made to files of the draft as corresponding CRDT files, the persistence service 111 maintains all CRDT patches corresponding to edits to the files made by all of the instances of the IDE accessing the draft. As CRDT patches are distributed to the instances of the IDE 115 by the synchronization service 109, so too does the synchronization service 109 provide the CRDT patches to the persistence service 111. The persistence service 111 may then merge all CRDT patches corresponding to edits made to each edited file of the draft. For each one of the edited files, persistence service 111 may store the merged CRDT patches as a corresponding CRDT file on any suitable storage medium such as a disk.

When a new IDE instance joins the draft, the new IDE receives the current state of the draft from the persistence service. The current state of the draft comprises the current CRDT files corresponding to all of the edited files of draft. As described below, the persistence service 111 may also play a role in the committing and discarding of drafts.

Figure 7:
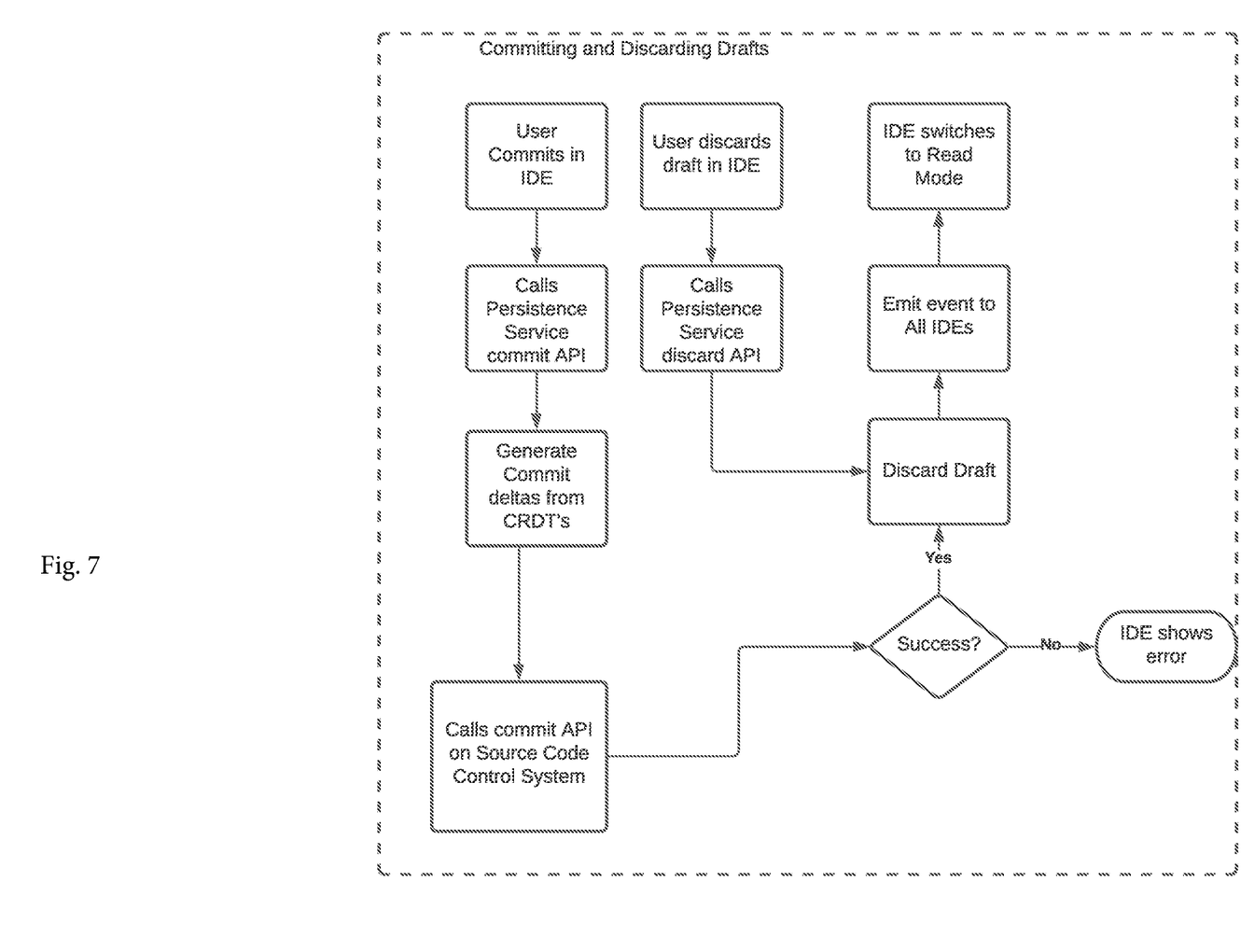
FIG. 7 illustrates committing drafts to a source code control system and discarding drafts, according to some implementations.

FIG. 7 illustrates committing drafts to the source code control system 113 and discarding drafts, according to some implementations. A specific instance of an IDE accessing a given draft may commit the draft to the source code control system. In some implementations, this can only be done by the instance of the IDE that owns the draft. In response to a control signal from the specific instance of the IDE (e.g., generated in response to a user selecting a "Commit Draft" component on an interface of the IDE), a commit of the draft to the source code control system 113 is generated, by the persistence service 111. In other words, the selection of the commit option by the user may result in the calling of a commit routine exposed by an API of the synchronization service 109. The current resolved state of the draft, in the form of the current resolved CRDT files stored by the persistence service 111, are then checked into the source code control system 113, on top of the state of the source code at the point from which the draft was made.

At the time of the commit, the draft consists of the files of the development project at a specific point in time as stored in the source code control system 113, plus the edits made subsequently by instances of the IDE 115, represented by the set of CRDT files. The edits represented by these CRDT files are committed to the source code control system 113, thereby creating a new version or branch of the development project. Thus, the commit is based on the stored merged CRDT patches made to each one of the edited files of the draft. Edits may be committed to the source code control system 113 by calling its exposed commit API. After the conflict-resolved edits made to each one of the edited files of the draft is committed to the source code control system, the draft may be discarded. This means that the CRDT files are cleared from the instances of the IDE and from the persistence service 111, and the IDE editors 201 are returned to read mode. Under some circumstances, the draft is not discarded, but instead may be "rebased" to point to the commit just created and continue its existence. Such circumstances may include long lived, shared drafts, as well as partial commits (commits made that do not include all the files changed in the draft).

As also illustrated in FIG. 7, the draft may be discarded by a specific instance of the IDE (e.g., the one that owns the draft) without being committed to the source code control system 113. Responsive to a control signal from the specific instance of the IDE (e.g., generated by a user selecting a "Discard Draft" GUI component), the draft is discarded as described above, without saving the edits to the source code control system.

In some implementations, the synchronization service 109 may also merge multiple drafts before committing them to the source code control system 113. It is to be understood that this is distinct from the CRDT-based resolution of conflicts resulting from concurrent editing of a given source file within a draft. Merging multiple drafts, by contrast, refers to merging multiple drafts of a given development project that were created concurrently, and may result in conflicts between the drafts. For example, suppose that user A and user B each create and edit a separate draft originating from the same point in time in the source code control system (in this context "users" can be users operating instances of the IDE). Suppose that at some point later user A commits draft A, whereas user B continues editing draft B. Subsequently, user B attempts to commit draft B. At this point, there may be conflicts between draft A, which was already committed, and draft B.

Therefore, whenever a user attempts to commit a draft, the synchronization service 109 may determine whether the draft is current, meaning whether or not a prior draft originating from the same point in time has already been committed. If so, the draft is not current, as is the case with draft B in the scenario being described. Therefore, rather than committing draft B on top of the already committed draft A, which would result in a source code control system level merge (e.g., a git merge) that may result in conflicts, the synchronization service 109 executes a virtual commit of draft B. To perform a virtual commit, the synchronization service 109 performs a source code control system level merge of draft B and the version of the development project at the point at which draft A was committed, in a sandbox outside of the source code control system. The merge headers from the source code control system level merge will show any conflicts resulting from committing draft B on top of draft A. If there are any conflicts, the owner of draft B (e.g., user B) is required to resolve these conflicts before draft B may be committed to the source code control system 113.

Figure 8:
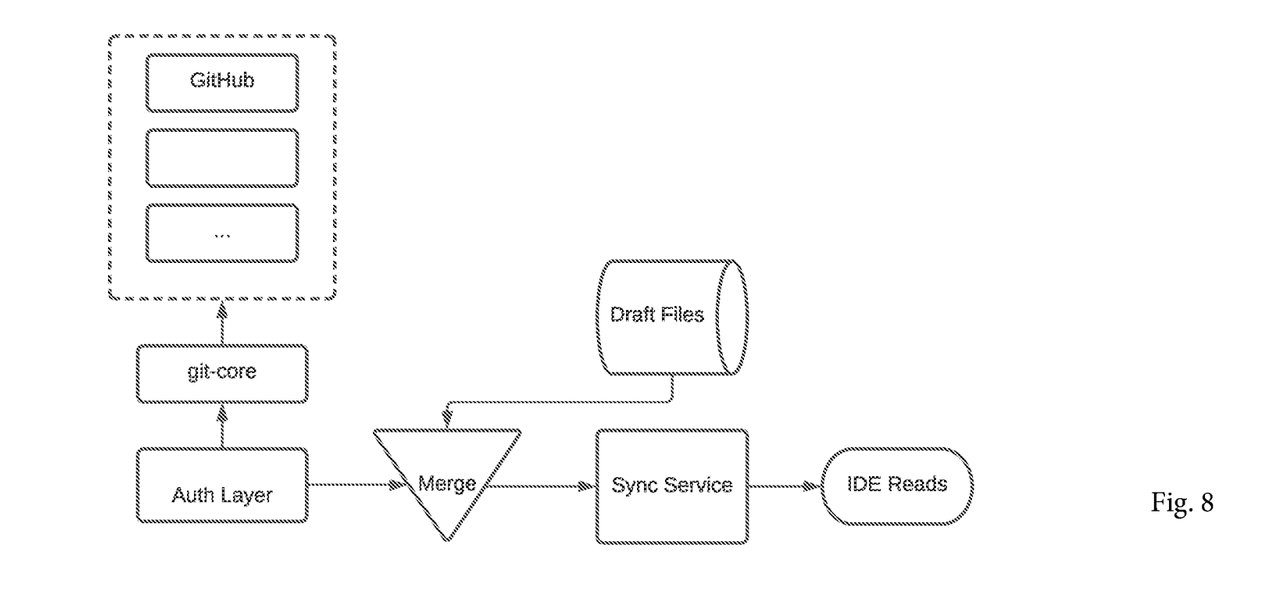
FIG. 8 illustrates operation of a source code control system, according to some implementations.

FIG. 8 illustrates the operation of the source code control system 113 according to some implementations. It is to be understood that the source code control system 113 may be implemented in the form of any of a number of available instantiations of git, such as GitHub 801 as illustrated in FIG. 8. In some implementations, the read, write and other desired access services of the specific git implementation are wrapped (the wrapper illustrated in FIG. 8 is denoted as git-core 803). Git-core 803 can be implemented so as to abstract the internal access details of the git instantiation, with an API exposing a higher (and broader) level of operations than the git implementation itself. This enables the code synchronization system 101 to be implemented on top of any instantiation of git, such that the calling party need not concern itself with the mechanics and formats of the underlying git provider. Git-core 803 can expose operations such as read file, write file, duplicate repository, etc., in a universal format.

More specifically, because of the nature of git, a remote git repository cannot be read from a local computing device. Instead, a local clone of the repository must be created by using the fetch operation. Therefore, a fetch operation must be performed whenever a read is performed against a branch of git. The higher level components of the code synchronization system 101 are shielded from these details by git-code 803, which exposes a higher level API for access operations as described above.

In some implementations the authentication functionality of the underlying git provider is also isolated and wrapped by a higher-level component that exposes an implementation agnostic interface. This wrapper is denoted as Auth Layer 805 in FIG. 8. Thus, the specific instantiation of git may be wrapped with an application programming interface ("API") exposing calls that abstract instantiation specific access and authentication details from the synchronization service 109 and other calling components. In some implementations, the wrapping functionality may also provide a read cache, because some git operations such as a fetch can be slow.

Figure 9:
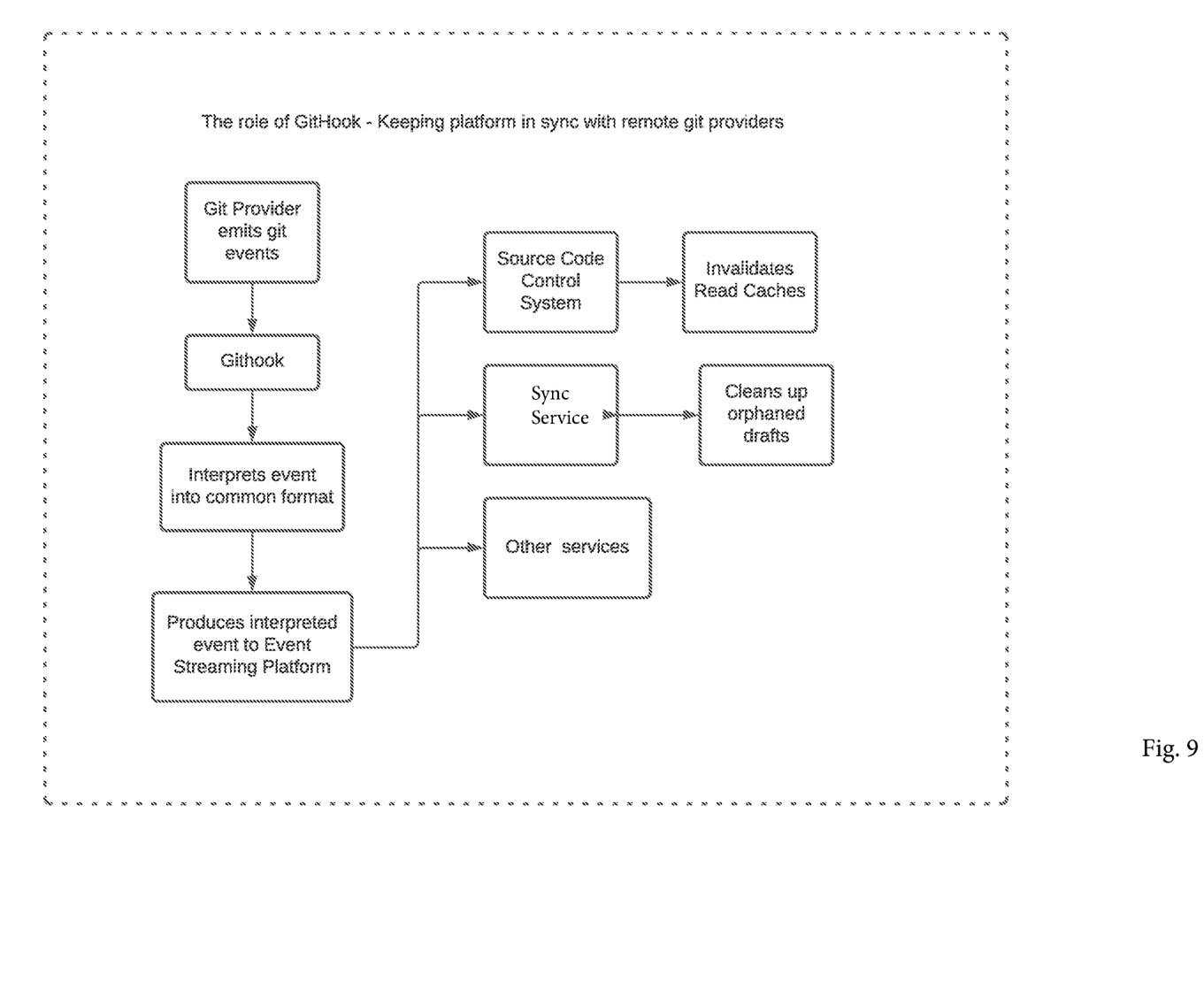
FIG. 9 illustrates a component for hooking git events, according to some implementations.

FIG. 9 illustrates a component called Githook 901 which may hook git events, interpret the hooked git events into a common format, and take actions concerning drafts in response to interpreted hooked git events, such as invalidating read caches and cleaning-up orphaned drafts.

In some implementations, the IDE provides interoperability functionality between different modes of operation, in order to accommodate coders with different levels of experience from beginners to master developers, and to seamlessly transition new coders as they progress through different levels of proficiency. The IDE provides different modes, starting, for example, with a visual mode for those who have not yet learned to code, but are able to create flows of logic by, for example, dragging and dropping visual components on a screen. This is a "no code" mode, in which code corresponding to the visually created logic flows are automatically generated behind the scenes.

Next a junior developer mode may be provided, in which code for logic flows such as loops, if/then statements, variable initializations and the like may be taught, for example by displaying corresponding code. For example, the junior developer may be shown the code that was generated automatically as a result of the work done visually in the no code mode, and given a chance to modify that code and see what results, as a learning exercise. Multiple levels during which a user is taught may be provided, in which the IDE monitors what the user is doing, and prompts them to take the next step, and/or provides relevant tutorials.

A full developer mode is also provided for experienced developers. More advanced modes may also be provided for senior developers, master developers, principal engineers, etc. The specific tools made available, the operation of the help functionality, the enabled features, etc., may be adjusted based on the mode as desired. In some implementations the modes are not discrete, but instead more features may be enabled overtime. For example, features and/or tools may be enabled one at a time or in specific batches, as a user advances from a beginner to a more experienced developer.

Figure 10:
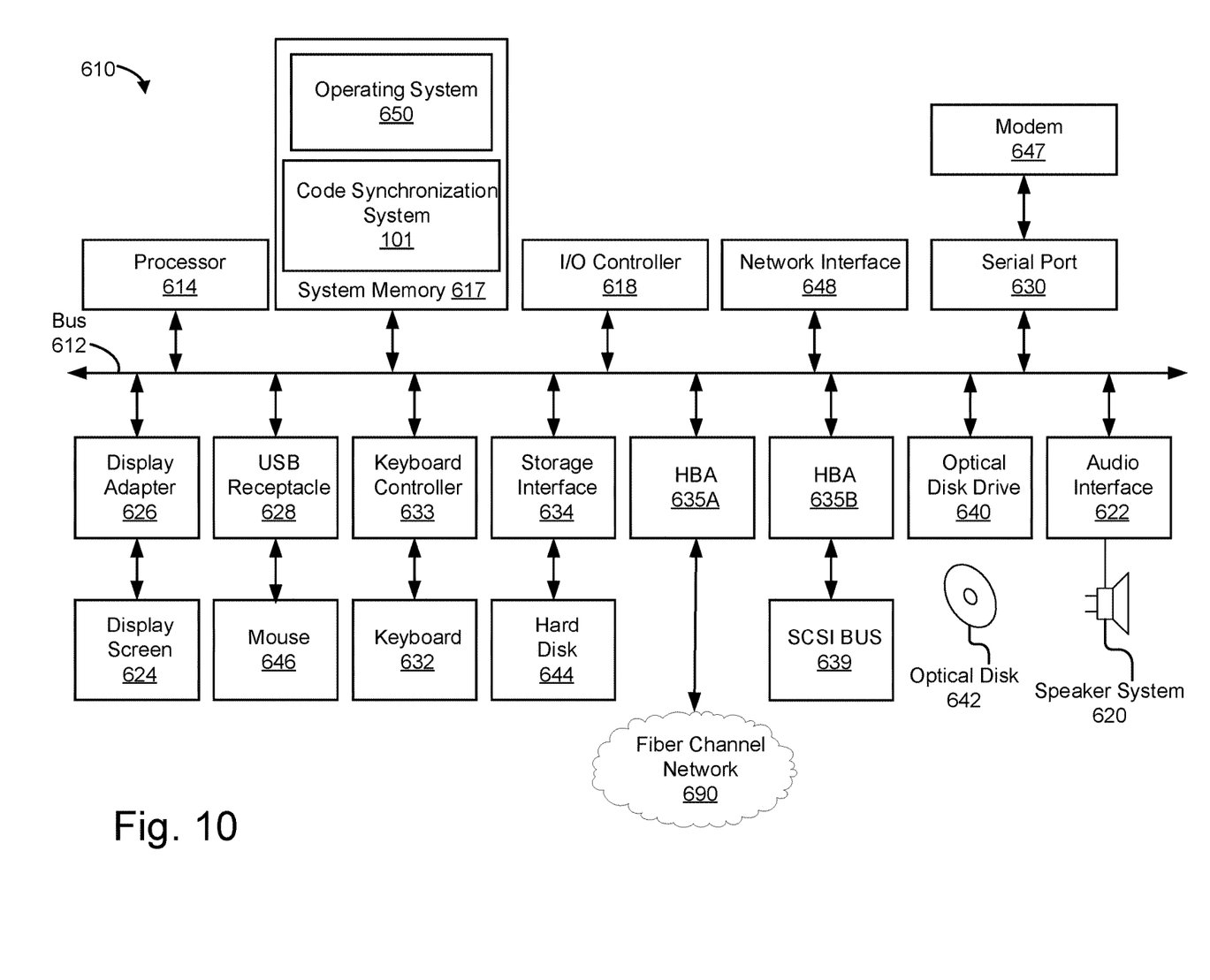
FIG. 10 is a block diagram of a computer system suitable for implementing a code synchronization system, according to some implementations.

FIG. 10 is a block diagram of an example computer system 610 suitable for implementing a code synchronization system 101. Both clients 103 and servers 105 can be implemented in the form of such computer systems 610. As illustrated, one component of the computer system 610 is a bus 612. The bus 612 communicatively couples other components of the computer system 610, such as at least one processor 614, system memory 617 (e.g., random access memory (RAM), read-only memory (ROM), flash memory), an input/output (I/O) controller 618, an audio output interface 622 communicatively coupled to an audio output device such as a speaker 620, a display adapter 626 communicatively coupled to a video output device such as a display screen 624, one or more interfaces such as Universal Serial Bus (USB) receptacles 628, serial ports 630, parallel ports (not illustrated), etc., a keyboard controller 633 communicatively coupled to a keyboard 632, a storage interface 634 communicatively coupled to one or more hard disk(s) 644 (or other form(s) of storage media), a host bus adapter (HBA) interface card 635A configured to connect with a Fibre Channel (FC) network 690, an HBA interface card 635B configured to connect to a SCSI bus 639, an optical disk drive 640 configured to receive an optical disk 642, a mouse 646 (or other pointing device) coupled to the bus 612, e.g., via a USB receptacle 628, a modem 647 coupled to bus 612, e.g., via a serial port 630, and one or more wired and/or wireless network interface(s) 648 coupled, e.g., directly to bus 612.

Other components (not illustrated) may be connected in a similar manner (e.g., document scanners, digital cameras, printers, etc.). Conversely, all of the components illustrated in FIG. 10 need not be present (e.g., smartphones and tablets typically do not have optical disk drives 640, external keyboards 632 or external pointing devices 646, although various external components can be coupled to mobile computing devices via, e.g., USB receptacles 628). The various components can be interconnected in different ways from that shown in FIG. 10.

The bus 612 allows data communication between the processor 614 and system memory 617, which, as noted above may include ROM and/or flash memory as well as RAM. The RAM is typically the main memory into which the operating system 650 and application programs are loaded. The ROM and/or flash memory can contain, among other code, the Basic Input-Output system (BIOS) which controls certain basic hardware operations. Application programs can be stored on a local computer readable medium (e.g., hard disk 644, optical disk 642) and loaded into system memory 617 and executed by the processor 614. Application programs can also be loaded into system memory 617 from a remote location (i.e., a remotely located computer system 610), for example via the network interface 648 or modem 647. In FIG. 10, the code synchronization system 101 is illustrated as residing in system memory 617.

The storage interface 634 is coupled to one or more hard disks 644 (and/or other standard storage media). The hard disk(s) 644 may be a part of computer system 610 or may be physically separate and accessed through other interface systems.

The network interface 648 and/or modem 647 can be directly or indirectly communicatively coupled to a network 107 such as the internet. Such coupling can be wired or wireless.

As will be understood by those familiar with the art, the subject matter described herein may be embodied in other specific forms without departing from the spirit or integral characteristics thereof. Likewise, the particular naming and division of the portions, modules, agents, managers, components, functions, procedures, actions, layers, features, attributes, methodologies, data structures and other aspects are not mandatory or significant, and the entities used that implement the subject matter described herein may have different names, divisions and/or formats. The foregoing description, for purpose of explanation, has been described with reference to specific implementations. However, the illustrative discussions above are not intended to be exhaustive or limiting to the precise forms disclosed. Many modifications and variations are possible in view of the above teachings. The implementations were chosen and described in order to best explain relevant principles and their practical applications, to thereby enable others skilled in the art to best utilize various implementations with or without various modifications as may be suited to the particular use contemplated.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, bytes, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms including "processing," "computing," "calculating," "determining," "displaying," or the like, refer to the action and processes of a computer system, or similar electronic device, that manipulates and transforms data represented as physical (electronic) quantities within the computer system's registers and memories into other data similarly represented as physical quantities within the computer system memories or registers or other such information storage, transmission or display devices.

Finally, the structure, algorithms, and/or interfaces presented herein are not inherently tied to any particular computer or other apparatus. Various general-purpose systems may be used with programs in accordance with the teachings herein, or it may prove convenient to construct more specialized apparatus to perform the method blocks. The structure for a variety of these systems will appear from the description above. In addition, the specification is not described with reference to any particular programming language. It will be appreciated that a variety of programming languages may be used to implement the teachings of the specification as described herein.

Accordingly, the disclosure is intended to be illustrative, but not limiting.

What is claimed is:

1. A computer implemented method for utilizing conflict-free replicated data types ("CRDTs") for synchronization of source code under development by a plurality of concurrent instances of an integrated development environment ("IDE"), the method comprising:
    accessing a draft of a development project by a plurality of instances of the IDE;
    wherein the development project comprises a plurality of source code files under a source code control system;
    wherein the draft comprises the files of the development project at a specific point in time as stored in the source code control system, and a set of edits subsequently made by instances of the IDE, the edits not having been committed to the source code control system;
    maintaining edits made to specific files of the draft as corresponding CRDT files, wherein a specific CRDT file is maintained for each edited file of the draft; and
    synchronizing edits made to files of the draft by the instances of the IDE, with the CRDTs resolving conflicts resulting from edits made to files of the draft by different ones of the instances, wherein each one of the instances of the IDE has access to the same version of the edited files of the draft, with conflicts having been resolved by the CRDTs.

2. The method of claim 1 wherein synchronizing edits made to files of the draft by the instances of the IDE further comprises:
   a specific instance of the IDE making an edit to a specific file of the draft;
   updating, by the specific instance of the IDE, a corresponding local CRDT file to reflect the edit made to the specific file of the draft; and
   pushing the edit as a CRDT patch to each of the other instances of the IDE accessing the draft.

3. The method of claim 2 wherein pushing the edit as a CRDT patch to each of the other instances of the IDE accessing the draft further comprises:
   transmitting the CRDT patch by the specific instance of the IDE to a synchronization service; and
   transmitting the CRDT patch by the synchronization service to each of the other instances of the IDE accessing the draft.

4. The method of claim 1 wherein synchronizing edits made to files of the draft by the instances of the IDE further comprises:
   receiving a CRDT patch corresponding to an edit made to a file of the draft by a specific one of the instances of the IDE, by each of the other instances of the IDE; and
   using the received CRDT patch to update a local corresponding CRDT file to reflect the edit, by each of the other instances of the IDE.

5. The method of claim 1 further comprising:
   maintaining, by a persistence service, CRDT patches corresponding to all edits to files of the draft made by the instances of the IDE accessing the draft.

6. The method of claim 5 wherein maintaining CRDT patches corresponding to all edits to files of the draft made by the instances of the IDE further comprises:
   merging all CRDT patches corresponding to edits made to each edited file of the draft, by the persistence service; and
   for each one of the edited files, storing the merged CRDT patches as a corresponding CRDT file, by the persistence service.

7. The method of claim 5 further comprising:
   receiving a current state of the draft, by a new instance of the IDE accessing the draft from the persistence service, the current state of the draft comprising current CRDT files corresponding to all edited files of draft.

8. The method of claim 1 further comprising:
   associating a source code editor of a specific instance of the IDE to a file placeholder, the file placeholder being associated with either a source code file in the source code control system or a CRDT file corresponding to an edited source code file in the draft.

9. The method of claim 8 wherein associating a source code editor of an instance of the IDE to a file placeholder further comprises:
   associating the source code editor to a file placeholder associated with a CRDT file corresponding to an edited source code file in the draft;
   making a two-way binding between an internal representation of the CRDT file of the source code editor and a representation of the CRDT file by an underlying CRDT document;
   synchronizing all edits made to the CRDT file by the source code editor to all other instances of the IDE accessing the draft;
   synchronizing all edits made to the corresponding edited source code file by other instances of the IDE to the specific instance of the IDE; and
   displaying synchronized edits in the source code editor.

10. The method of claim 8 wherein associating a source code editor of an instance of the IDE to a file placeholder further comprises:
    associating the source code editor to a file placeholder associated with a specific source code file in the source code control system that has not yet been edited in the draft; and
    responsive to the specific source code file being edited by an instance of the IDE, associating the file placeholder with a corresponding CRDT file in the draft.

11. The method of claim 1 further comprising:
    committing the draft to the source code control system, by a specific instance of the IDE that is accessing the draft.

12. The method of claim 11 wherein committing the draft to the source code control system further comprises:
    responsive to a control signal from the specific instance of the IDE, generating a commit to the source code control system, by a persistence service, the commit being based on stored merged CRDT patches made to each one of the edited files of the draft;
    committing conflict-resolved edits made to each one of the edited files of the draft to the source code control system, by the persistence service; and
    discarding the draft, by the persistence service.

13. The method of claim 1 further comprising:
    discarding the draft, by a specific instance of the IDE that is accessing the draft; and
    responsive to a control signal from the specific instance of the IDE, discarding the draft without saving edits to the source code control system, by a persistence service.

14. The method of claim 1 wherein maintaining edits made to specific files of the draft as corresponding CRDT files, wherein a specific CRDT file is maintained for each edited file of the draft, further comprises:
    maintaining edits made to specific files of the draft as corresponding CRDT files, wherein a specific CRDT file is maintained for each edited file of the draft, by each instance of the IDE accessing the draft.

15. The method of claim 1 wherein synchronizing edits made to files of the draft by the instances of the IDE, with the CRDTs resolving conflicts resulting from edits made to files of the draft by different ones of the instances, further comprises:
    synchronizing edits made to files of the draft by a CRDT implementation on each instance of the IDE.

16. The method of claim 1 further comprising:
    merging multiple drafts in a sandbox outside of the source code control system;
    resolving conflicts between the multiple drafts outside of the source code control system; and
    committing the conflict-resolved drafts to the source code control system.

17. The method of claim 1 wherein each instance of the IDE further comprises at least:
    a source code editor;
    a file placeholder comprising a file primitive associated with either a source code file in the source code control system or a CRDT file corresponding to an edited source code file in the draft;
    a synchronization processes; and
    a CRDT implementation.

18. The method of claim 17 wherein:
    the CRDT implementation further comprises YJS.

19. The method of claim 1 wherein the source code control system further comprises an instantiation of git, the method further comprising: comprises
  wrapping the instantiation of git with an application programming interface ("API") exposing calls that abstract access and authentication details of the instantiation of git.

20. The method of claim 19 further comprising:
  hooking git events;
  interpreting hooked git events into a common format; and
  taking actions concerning the draft in response to interpreted hooked git events.

21. At least one non-transitory computer-readable storage medium for utilizing conflict-free replicated data types ("CRDTs") for synchronization of source code under development by a plurality of concurrent instances of an integrated development environment ("IDE"), the at least one non-transitory computer-readable storage medium storing computer executable instructions that, when loaded into computer memory and executed by at least one processor of a computing device, cause the at least one computing device to perform the following steps:
  accessing a draft of a development project by a plurality of instances of the IDE;
  wherein the development project comprises a plurality of source code files under a source code control system;
  wherein the draft comprises the files of the development project at a specific point in time as stored in the source code control system, and a set of edits subsequently made by instances of the IDE, the edits not having been committed to the source code control system;
  maintaining edits made to specific files of the draft as corresponding CRDT files, wherein a specific CRDT file is maintained for each edited file of the draft; and
  synchronizing edits made to files of the draft by the instances of the IDE, with the CRDTs resolving conflicts resulting from edits made to files of the draft by different ones of the instances, wherein each one of the instances of the IDE has access to the same version of the edited files of the draft, with conflicts having been resolved by the CRDTs.

22. A computer system for utilizing conflict-free replicated data types ("CRDTs") for synchronization of source code under development by a plurality of concurrent instances of an integrated development environment ("IDE"), the computer system comprising:
  at least one processor;
  system memory;
  an access module residing in the system memory, the access module being configured to access a draft of a development project by a plurality of instances of the IDE;
  wherein the development project comprises a plurality of source code files under a source code control system;
  wherein the draft comprises the files of the development project at a specific point in time as stored in the source code control system, and a set of edits subsequently made by instances of the IDE, the edits not having been committed to the source code control system;
  a maintenance module residing in the system memory, the maintenance module being configured to maintain edits made to specific files of the draft as corresponding CRDT files, wherein a specific CRDT file is maintained for each edited file of the draft; and
  a synchronization module residing in the system memory, the synchronization module being configured to synchronize edits made to files of the draft by the instances of the IDE, with the CRDTs resolving conflicts resulting from edits made to files of the draft by different ones of the instances, wherein each one of the instances of the IDE has access to the same version of the edited files of the draft, with conflicts having been resolved by the CRDTs.

* * * * *